United States Patent Office 2,987,511
Patented June 6, 1961

2,987,511
PROCESS FOR POLYMERIZING OLEFINIC HYDROCARBONS
Joseph T. Arrigo, Broadview, Ill., assignor, by mesne assignments, to Universal Oil Products Company, Des Plaines, Ill., a corporation of Delaware
No Drawing. Filed July 10, 1958, Ser. No. 747,590
10 Claims. (Cl. 260—93.7)

This invention relates to a process for polymerizing olefinic hydrocarbons, especially ethylene, to form "hard" polymers thereof which are particularly useful in the fabrication of molded articles such as containers (bottles, bags, tubes, etc.), pipes, pliable toys, etc. and for the production of articles generally in which resinous and plastic materials are useful starting materials. More specifically, this invention concerns a process for the manufacture of high molecular weight polyolefin plastics, the polymerization of the olefinic monomer being effected in the presence of a particular combination of catalyst components, comprising a heteropolymolybdate and a combination of metallic aluminum and a halide of aluminum or an alkyl aluminum halide complex.

It has been found that a very desirable class of polymeric olefins referred to herein as "hard" polymers may be produced by the polymerization of an olefin hydrocarbon at certain reaction conditions and in the presence of a particular combination of catalyst components which product polymers having molecular weights substantially in excess of about 10,000 and softening points substantially above the boiling point of water, and in most cases above about 125° C. This class of hydrocarbon polymer has been particularly sought after by the plastics and resin molding industries, because of the desirable physical and structural stability of articles molded therefrom at temperatures above the boiling point of water, making the product especially adapted for use as the starting material in the fabrication of articles which are subjected to high temperatures during their use, such as articles which must be sterilized with hot water or steam (i.e., at temperatures in excess of 100° C.), and which must also possess sufficient structural rigidity at these temperatures to resist plastic deformation from the original shape of the molded article.

The present olefin polymers maintain their shape and other structural characteristics at temperatures substantially in excess of the boiling point of water and thus may be heated at these temperatures without undergoing plastic flow deformation. Such articles as combs, baby bottles, containers for infant's food, surgical tubing and other articles desired in breakage-resistant form and fabricated from the present polymeric material may accordingly be sterilized by placing the same in a steam bath or a hot water bath without suffering any substantial change in shape or size. The polymer products of this invention also have desirable properties from the standpoint of hardness and toughness, being particularly outstanding in these respects compared to polyolefin plastics heretofore known in that they possess substantially greater tensile strength and tear resistance than such products of the prior art. These properties are especially evident in molded machine parts which are subjected to mechanical wear, such as rollers, bearings, cams, gears and a multitude of other mechanical shapes and forms.

In one of its embodiments the present invention relates to a process for polymerizing the olefinic hydrocarbon which comprises contacting said hydrocarbon at a temperature of from about 25° to about 300° C. and at a superatmospheric pressure with a catalyst comprising a mixture of an alkyl aluminum halide, aluminum metal and a compound selected from the group consisting of a heteropolymolybdic acid and a salt of said acid.

A more specific embodiment of this invention relates to a process for producing solid ethylene polymer having a melting point above about 125° C. which comprises passing ethylene in contact with a catalyst comprising a mixture of dimeric sodium 9-molybdophosphate, metallic aluminum and aluminum chloride at a temperature of from about 25° to about 300° C. and at a pressure of from about 10 to about 100 atmospheres.

Other embodiments of this invention relating to specific aspects of the above process for polymerizing olefinic hydrocarbons will be referred to in greater detail in the following further description of the invention.

The polymeric products of this invention are essentially high molecular weight hydrocarbons formed by polymerizing or condensing olefinic hydrocarbons of lower molecular weight by means of the process referred to generally as a polymerization reaction, effected under such conditions and for a period of time sufficient to form hydrocarbons having molecular weights substantially in excess of about 10,000 generally in the region above about 30,000, depending upon the olefinic monomer utilized as the starting material. The charging stock to the present polymerization process is a mono-olefinic hydrocarbon or an olefin-containing mixture of hydrocarbons, the olefinic component of which contains up to about 5 carbon atoms, although under certain reaction conditions, homologs of the above (i.e., higher molecular weight monomers), or recycled low molecular weight fractions of a preceding polymerization process may be employed as charging stock. Ethylene, in general, is preferred herein as starting material because of its tendency to form solid polymers of unbranched chain structure which are particularly resistant to chemical attack (such as, oxidation by atmospheric oxygen). For other uses of the final product propylene may be preferred herein as starting material to form plastic-like materials of usually higher molecular weight and greater toughness and hardness than the polymeric products formed by polymerizing ethylene. Further, 1-alkenes, such as 1-butene and 1-pentene, are especially preferred over their isomers such as 2-butene and 2-pentene. Also, the straight-chain alkenes are preferred over their branched-chain isomers such as 2-methylpropene and 2-methyl-1-butene. The olefin monomer may be charged to the process either individually (that is, as a substantially pure olefin monomer of specific structure) or in admixture with other olefins, such as, for example, the mixture of $C_2$–$C_4$ olefins separated from the light gaseous product of a thermal cracking process or in admixture with other hydrocarbons, such as paraffins and cycloparaffins which may be present in the light gases of a thermal cracking process or formed by the dehydrogenation of a paraffin of the same number of carbon atoms. Cycloalkenes, such as cyclohexene, may also be utilized, either individually or in admixture with other olefins or other hydrocarbons. In other instances low molecular weight mono-olefins, particularly ethylene, may be mixed with a normally liquid hydrocarbon, such as cyclohexane, isopentane, or heptane (preferably a normal alkane) to provide a reaction mixture in which the saturated hydrocarbons acts as a diluent of the olefin monomer which undergoes polymerization and is essentially the active ingredient of the hydrocarbon mixture. Such diluents may range from normally liquid materials which are relatively inert in the reaction, such as the normal paraffins to materials which are not necessarily inert in the process, such as an aromatic hydrocarbon (e.g., benzene, toluene, xylene, etc. which may undergo various side reactions with the olefin reactants or its polymer, such as mono- or polyalkylation reactions, etc.), a nitroparaffin (e.g., nitromethane, nitrobutane, etc.) and other materials which dilute the mono-olefin reactant, disperse the same in its contact with the catalyst, and thereby alter the physical properties and particularly the ultimate molecular weight of the polymer product formed during the course of the polymerization reaction.

The component present in the reaction mixture of the present process which accounts for the production of a selective polymeric material referred to herein as "hard" polymer is the particular mixture of catalyst components provided in the process, the catalyst mixture comprising a combination of: aluminum metal, a halide of aluminum (which, together react with the olefin monomer at the designated reaction conditions to form an alkyl aluminum halide) and a heteropolymolybdate salt. The aluminum component of the catalyst mixture (if charged individually into the reactions) is preferably substantially pure aluminum, although certain aluminum-containing alloys will also provide the desired catalytic effect. The metal is also preferably supplied in the form of particles in a relatively fine state of subdivision. The aluminum halide present in the catalyst mixture (is supplied individually to the process) may be formed in situ by passing a hydrogen halide, such as hydrogen chloride gas or the elemental halogen itself, such as chlorine gas, or a mixture of halides and/or hydrogen halides into contact with the aluminum metal prior to the polymerization reaction, thereby forming an aluminum halide (ordinarily, the aluminum trihalide) on the surface of the metallic aluminum component of the catalyst mixture. The halide of aluminum may also be added to the catalyst mixture as such, for example, in the form of anhydrous aluminum trichloride, aluminum tribromide, or aluminum triiodide (in the order of preference), as an aluminum oxychloride, aluminum oxybromide, aluminum dibromochloride, aluminum dichlorobromide, etc. Aluminum chloride is generally preferred herein because of its high order of effectiveness in promoting the desired polymerization reaction and further, because of its relative abundance and low cost. Additional preference is also accorded the catalysts in which the quantity of aluminum halide (dependent upon the particular halide selected) in the catalyst mixture is present in an amount representing a molar ratio of aluminum halide to metallic aluminum of less than 0.5 to 1, the preferred catalyst mixtures containing from 0.001 to about 0.1 mole of aluminum halide per mole of aluminum metal in the catalyst mixture. The mixture of aluminum metal and aluminum halide which serves as an essential portion of the catalyst composition may alternatively be supplied in the form of an alkyl aluminum halide complex, the alkyl group of which is preferably of the same identity as the alkyl group corresponding in number of carbon atoms and chain structure to the olefinic reactant charged to the process, although the latter preference is not necessarily a necessity. Thus, an alkylaluminum halide may be formed in a reaction preceding the polymerization process but in the same reactor by mixing the olefin reactant, such as ethylene, with a mixture of aluminum and the desired aluminum halide, the product of the reaction generally being a mixture of mono-alkyl aluminum dihalide, dialkylaluminum halide, and trialkyl aluminum, known as the corresponding alkyl sesquihalide, and thereafter charging additional olefin and the heteropolymolybdate catalyst into the reactor at polymerization reaction conditions. Whether charged individually as such or whether formed in situ during the reaction, the alkylaluminum halide complex is considered to be an essential component of the catalyst composition which accounts for the activity of the combination of catalyst ingredients in promoting polymerization of the olefin reactant to form the particular, special, "hard" polymer of the invention.

The ingredient of the catalyst composition herein referred to as heteropolymolybdic acid or a heteropolymolybdate salt thereof is a crystalline material prepared by synthetic means prior to the polymerization reaction, extraneous to the present process and herein referred to generally as the heteropolymolybdates. The heteropolymolybdic acids and their salts, either in their hydrated or dehydrated state, may be selected from several series of compounds in which the atomic ratio of the hetero metal atom to molybdenum varies from 1:6 to 1:12, including certain dimeric forms, represented by the following empirical formulas:

$Z_{(8-n)}(X^{+n}Mo_{12}O_{40})$, where X:Mo is 1:12
$Z_{(12-n)}(X^{+n}Mo_{12}O_{42})$, where X:Mo is 1:12
$Z_{(12-n)}(X^{+n}Mo_{11}O_{39})$, where X:Mo is 1:11
$Z_{(2y-50-n)}(X^{+n}Mo_{10}O_y)$, where X:Mo is 1:10
$Z_{(10-n)}(X^{+n}Mo_9O_{32})$, where X:Mo is 1:9
$Z_{(12-n)}(X^{+n}Mo_6O_{24})$, where X:Mo is 1:6
$Z_{(16-2n)}(X_2^{+n}Mo_{18}O_{62})$, where X:Mo is 2:18
$Z_{(2y-102-2n)}(X_2^{+n}Mo_{17}O_y)$, where X:Mo is 2:17
$Z_{(12-2n)}(X_2^{+n}Mo_{12}O_{42})$, where X:Mo is 2:12

In the foregoing empirical formulas of heteropolymolybdates useful as catalytic components in the present process, either individually or as mixtures of two or more individuals, the element: Z represents a monovalent positive ion selected from the group consisting of hydrogen and an alkali metal such as lithium, sodium, potassium, etc. and X represents a hetero atom selected from a relatively large group of elements comprising phosphorus ($P^{+5}$), arsenic ($As^{+5}$), cerium ($Ce^{+4}$), tin ($Sn^{+4}$), silicon ($Si^{+4}$), titanium ($Ti^{+4}$), zirconium ($Zr^{+4}$), germanium ($Ge^{+4}$), cobalt ($Co^{+4}$), nickel ($Ni^{+4}$), aluminum ($Al^{+3}$), manganese ($Mn^{+2}$), platinum ($Pt^{+4}$) and others. Thus, when Z in the above formulas is hydrogen, the formula represents a heteropolymolybdic acid. One of the preferred species hereof are the heterophosphomolybdic acids and their sodium salts, representing one of the most effective and readily available species. Typical representative specific compounds within the group represented by the above empirical formulas include, for example, the following:

Sodium phospho-12-molybdate
$Na_3(PMo_{12}O_{40})$
Phospho-12-molybdic acid
$H_3(PMo_{12}O_{40})$
2-arseno-18-molybdic acid
$H_6(As_2Mo_{18}O_{62})$
2-phospho-18-molybdic acid
$H_6(P_2Mo_{18}O_{62})$
Sodium 2-chromi-12-molybdate
$Na_3(Cr_2Mo_{12}O_{42})$
Sodium silico-12-molybdate
$Na_4(SiMo_{12}O_{40})$
Sodium ceri-12-molybdate
$Na_8(CeMo_{12}O_{42})$ and others. Although the heteropolymolybdic acid or the heteropolymolybdate salt thereof preferably constitutes a major proportion of the catalyst combination, amounts from as little as 1 to 2 percent by weight, up to 70 to 80 percent of the mixture of catalyst ingredients are also effective, but not necessarily with the same degree of effectiveness as mixtures containing from about 30 to 60 weight percent of the heteropolymolybdate or free acid. Such preferred compositions desirably contain from 1.0 percent to about 40 percent by weight of metallic aluminum and from about 0.01 percent to 10 percent by weight of the aluminum halide component.

The effectiveness of the present catalyst in promoting end-of-the-chain polymerization (i.e., condensation of the polymer present in the reaction mixture with the monomer undergoing reaction therewith is dependent upon an intimate association of the catalyst components in the reaction mixture; that is, an intimate mixing of the heteropolymolybdic acid or salt with the aluminum and the aluminum halide components (or alkyl aluminum halide, formed in situ therefrom) of the catalyst. The particles of molybdate, aluminum halide, and aluminum act catalytically in activating the olefin monomer molecules to condense with another monomer or with a previously formed polymer (also having a resident double bond) only in combination since a polymer having the properties of the present product does not form in the presence of only one or a pair of the catalyst components. It is considered essential, therefore, that the reaction mixture containing the catalyst and olefin monomer, as well as the previously formed polymer, be thoroughly agitated in order to promote the reaction and maintain the catalyst at a higher level of catalytic activity. In general, the number of active centers at which polymerization occurs in the reaction mixture increases as the intimacy of the catalytic components increases through agitation and stirring. A particularly preferred type of reaction vessel for the present polymerization process, therefore, is a stirred or rotating autoclave wherein the catalyst and olefin monomer reactants and a diluent, if desired, are intimately contacted at the present selective reaction conditions, referred to herein.

Although substantially pure metallic aluminum is preferred as the source of the aluminum component of the present catalyst mixture, various alloys of aluminum, including such typical alloys as Raney-nickel (consisting of a homogeneous alloy of aluminum and nickel) and Devarda's alloy (consisting of an alloy of copper, aluminum and zinc), as well as other alloys containing appreciable proportions of aluminum, such as aluminum-iron, aluminum-chromium and aluminum-molybdenum alloys in which the proportion of aluminum is generally greater than 25 parts per 100 parts of alloy by weight may also be utilized in the present process.

The aluminum may also be supplied to the reaction zone in the form of a tube or a pipe (backed-up, if desired, by an iron or steel pipe to provide greater physical strength), and the reaction carried out in the aluminum tube by placing a mixture of the metal halide and molybdate catalyst components therein and passing the olefin reactant through the resulting packed aluminum tube at the desired reaction temperature. The tube or pipe may also have deposited thereon the aluminum halide (which may be formed on the surface of the tube or pipe, for example, by passing the hydrogen halide or halogen corresponding to the desired aluminum halide in gaseous form through the tube) together with the normally solid molybdate component of the catalyst. Alternatively, the aluminum may be in the form of a rod or foil extending through the reactor.

Since polymerization takes place at or near the surface of the aluminum component of the catalyst, a desired characteristic, in general, of the aluminum metal is that it provides a large exposed surface area of the metal per unit mass of its weight and it is thus preferred that the aluminum-containing metal be in a relatively distended form; that is, in a form having a relatively large surface area per volume of the metal in the reaction zone in which its thickness is but a fraction of its length and/or width.

Polymerization of the olefinic hydrocarbon charge stock in accordance with the present process for the production of a predominantly "hard" polymer in the presence of the specific catalyst herein provided, is effected at particular reaction conditions which are suitable for the production of such polymers, although for certain purposes "soft" polymers having the characteristics of petroleum waxes or even liquid polymers may be desired and produced as a product or by-product of the present process, albeit at other reaction conditions. Although the polymerization reaction may generally be effected at atmospheric pressure, it is usually preferred to carry out the present process at a superatmospheric pressure, up to about 1500 p.s.i., or at even higher pressures (preferably from about 150 to about 1500 p.s.i.), the preferred pressure in each instance being dependent upon the type of product desired and also upon the particular hydrocarbon charge stock. Suitable reaction temperatures for effecting the polymerization reaction of this process are within the range of from about room temperature (that is, at about 25° C.) up to a temperature generally not in excess of about 300° C., and preferably, from about 80° to about 180° C. As in the case of the pressure variable, the required reaction temperature is dependent upon the character of the olefinic feed sock, the presence or absence of a diluent in the reaction mixture, and the manner of contacting the charge stock with the catalyst, as well as the type of ultimate product desired.

A particularly desirable method for effecting the present polymerization process comprises mixing the catalyst ingredients in an inert solvent, such as a normally liquid paraffinic hydrocarbon (e.g., n-pentane, n-hexane, cyclohexane, a hexane isomer mixture or a mixture of other normal or isoparaffins, such as the low boiling cuts of a straight-run gasoline) and thereafter, introducing the olefinic feed stock into the resulting mixture at the desired temperature and pressure conditions, the diluent being removed from the reaction mixture following completion of the polymerization by distillation therefrom.

It is usually desirable to carry out the polymerization in the substantial absence of air or oxygen, although hydrogen may be present in the reaction zone without seriously affecting the course of the reaction or the completeness of olefin monomer participation in the production of the polymer. The product formed, however, is not necessarily the same as the product obtained by polymerization of the olefin in the substantial absence of hydrogen. It is to be noted, however, that the polymer formed in the presence of hydrogen is generally of lower melting point than the product from the same monomer polymerized in the absence of hydrogen.

The solid aluminum-containing metal, the aluminum halide and the heteropolymolybdate components of the catalyst, as well as the olefinic hydrocarbons charge stock, exist in various physical states within the reaction mixture, but it is the mutual co-action between the various components of the catalyst and the contact of the hydrocarbon feed stock with these catalytic components in combination or in admixture, and particularly the maintenance of the specific polymerization reaction conditions and the co-action of catalyst components in the presence of each other and at the indicated reaction conditions which results in the production of the "hard" type of polymer herein desired as product. In order to obtain such co-action the olefinic hydrocarbon in gaseous or liquid phase is contacted with the catalyst at the above reaction conditions while the mixture is so agitated that the surface of the solid aluminum metal is in contact not only with the surface of the molybdate but also with the aluminum halide. Generally, the reaction is most rapid and proceeds toward completion to the greatest extent when the reaction mixture containing the solid catalytic components is rapidly stirred so as to provide a continuously exposed fresh surface of the heteropolymolybdate, aluminum halide and aluminum metal to the action of the surrounding olefin monomer. In many instances, after the initial formation of polymer within the reaction zone, additional polymer continues to form around such active centers of polymerization, possibly even without actual contact with the catalytic components. The catalyst is believed to act by virtue of reducing the activation energy required for the formation of the initial polymer, subsequent polymerization taking place by virtue of what may be referred to as a "chain reaction," involving the condensation of vicinal molecules of monomer on the end of the chain of previously formed polymer, thereby building up long chains of polymers of extremely high molecular weight.

As heretofore indicated the present products are obtained only by virtue of the polymerization catalyst and the particular reaction conditions coupled therewith as herein specified, the specific catalyst being capable of forming the polymer only by virtue of its composition. These "hard" polymers having softening points generally above about 125° C., in certain instances soften only at much higher temperatures, existing in the form of horn-like materials which are extremely hard but which are sufficiently elastic and tough to resist breakage and cracking even at relatively low temperatures. The refractory properties of the present polymers make them particularly suitable for use in applications where the maintenance of structural shape and contour at relatively high temperatures is particularly desirable, as in the case of reaction vessels heated to high temperatures by superheated steam. The present products are generally mixtures of polymers of various molecular weights, usually averaging above about 10,000 and mostly above about 50,000, a major proportion of the product having a molecular weight within the range of 100,000 to 500,000; smaller proportions of the product may be of even higher molecular weight. The product may be separated into fractions corresponding to certain ranges of molecular weights by extracting the mixed polymer product with various solvents in which the individual fractions are selectively soluble. The lower molecular weight fractions are generally more pliable and softer than the high molecular weight polymers which are harder and more structurally rigid.

This invention is further illustrated with respect to several of its specific embodiments in the following examples which are presented for illustrative purposes only with no purpose of limiting the scope of the invention necessarily in accordance therewith.

*Example I*

A solid, hard ethylene polymer was prepared in accordance with the process of this invention by polymerizing an ethylene-containing gas in a pressure autoclave containing a catalyst mixture consisting of a heteropolymolybdate, aluminum chloride and finely powdered metallic aluminum. For this purpose a mixture of 5 grams of aluminum paint pigment (finely powdered aluminum metal), 5 grams of powdered dimeric sodium 9-molybdophosphate, $(Na_6P_2Mo_{18}O_{62}) \cdot XH_2O$, or, as it is sometimes also called, sodium 2-phospho-18-molybdate, and 3 grams of anhydrous aluminum chloride in 100 grams of n-heptane diluent was placed in the glass liner of a pressure autoclave and sealed into the autoclave after displacing most of the air from the inside of the reactor with nitrogen. The autoclave was then flushed twice with nitrogen and thereafter charged to a pressure of 50 atmospheres with ethylene. The autoclave was then heated slowly to 185° C. and rotated for a period of 6 hours. The maximum pressure within the autoclave during the reaction was 75 atmospheres. Following the above reaction period, after the contents of the autoclave had cooled to room temperature, the pressure was 6 atmospheres. Upon release of pressure and opening the autoclave, the product in the liner consisted of 4.8 grams of a white solid in the bottom of the liner and 12.5 grams of a clear oil having a boiling point above 170° C. The solid polymer product is a granular material which softened at about 130–145° C. and remained gummy up to about 300° C. When compressed in a Clark press at 160–165° C. and at 10,000 p.s.i. pressure, a flexible, translucent sheet having good tensile strength and tear resistance was formed. The oil portion of the product may be charged, together with the catalyst ingredients in a second polymerization reaction at the above conditions and with additional ethylene to increase the yield of the solid portion of the product.

Utilizing a mixture of propylene-propane containing 75% by weight of the olefin in a polymerization process effected at reaction conditions similar to the foregoing run, a product having a somewhat higher softening point in the range of about 150–160° C. is produced.

*Example II*

A product similar to the polymer formed in Example I, above, is formed by heating a mixture of 10 grams of aluminum powder, 15 grams of phospho-12-molybdic acid (or 12-molybdophosphoric acid) and 2.5 grams of aluminum chloride at a temperature of 135–165° C. (maximum pressure, 92 atmospheres) for 3 hours at an initial ethylene pressure of 65 atmospheres. Following the above period of reaction and after cooling the autoclave to room temperature, the pressure drops to 26 atmospheres. The product comprises 18 grams of hard, grayish, yellow material having a softening point of about 135° C. The polymer, which is extractable from the above product with hot toluene in a Soxhlet extractor, softened at about 140° C.

*Example III*

The indispensability of the heteropolymolybdate in the catalyst composition is indicated by the fact that when the polymerization is effected in the presence of a catalyst composition consisting only of a mixture of aluminum chloride and aluminum (that is, a composition from which the heteropolymolybdate is excluded) in an otherwise essentially similar process as that of Example II, above, the reaction failed to yield a solid ethylene polymer of the type obtained in the preceding run. Thus, when a mixture of 10 grams of powdered aluminum and 5 grams of anhydrous aluminum chloride is charged into the rotating pressure autoclave, flushed with nitrogen and gradually heated with ethylene at an initial pressure of ethylene of 65 atmospheres, a liquid polymer is formed at temperatures generally below about 100° C., the pressure dropping to 12 atmospheres before the autoclave reaches a temperature of 160° C. This product (28 grams) boiled over a wide boiling range and the last traces of liquid could be distilled completely under vacuum without depositing a residue of solid polymer. It is believed that the mechanism of the polymerization reaction involving aluminum chloride as catalyst is essentially different than the mechanism of the polymerization involving the present catalyst consisting of an aluminum metal, aluminum chloride, and a heteropolymolybdate, the former catalyst yielding polymers in which the components are of highly branched-chain structure and of relatively low molecular weight, whereas the present catalyst produces essentially "linear" polymers of much greater molecular weight.

In a similar run utilizing anhydrous aluminum chloride alone as the catalyst (15 grams) at the temperature and pressure at which the run of Example II is effected, the product is exclusively liquid, boiling over a broad range, but containing no solid polymer as a residue of such distillation.

*Example IV*

The fact that the formation of a solid polyethylene product depends upon the presence of both the aluminum and the aluminum halide components in the catalyst composition is demonstrated in the following run in which polymerization of ethylene is attempted in the presence of the heteropolymolybdate alone. For this purpose 15 grams of sodium phospho-12-molybdate is charged into the glass liner of the pressure autoclave followed by flushing the air from the liner with nitrogen, charging ethylene into the autoclave to an initial pressure of 65 atmospheres, and thereafter gradually heating the autoclave and its contents over a period of six hours to a maximum temperature of 165° C. After cooling the autoclave to room temperature (at which temperature the final pressure is still 55 atmospheres) examination of the products indicates that only a minor amount of thermal polymerization occurs in the presence of the phospho-12- molybdate itself, a small quantity (0.5 gram) of oil being recovered. It may be concluded that the phospho-12-molybdate alone does not provide the catalytic effects of a mixture thereof with the aluminum metal and the aluminum halide components in combination.

I claim as my invention:

1. A process for polymerizing an olefinic hydrocarbon which comprises contacting said hydrocarbon at a temperature of from about 25° to about 300° C. with a catalyst mixture of an alkyl aluminum halide and a compound selected from the group consisting of a heteropolymolybdic acid and a salt of said acid.

2. The process of claim 1 further characterized in that said olefinic hydrocarbon contains from 2 to about 5 carbon atoms per molecule.

3. The process of claim 2 further characterized in that said hydrocarbon is ethylene.

4. The process of claim 2 further characterized in that said hydrocarbon is propylenes 5. The process of claim 1 further characterized in that the polymerization is effected in the presence of an inert paraffinic hydrocarbon diluent.

6. The process of claim 1 further characterized in that said compound is phospho-12-molybdic acid.

7. The process of claim 1 further characterized in that said compound is dimeric sodium 9-molybdophosphate.

8. The process of claim 1 further characterized in that said alkyl aluminum halide is the reaction product of aluminum metal, aluminum chloride and a portion of said olefinic hydrocarbon.

9. The process of claim 8 further characterized in that said aluminum metal is reacted in the form of finely divided particles of aluminum.

10. A process for polymerizing ethylene to form a hard ethylene polymer which comprises contacting ethylene at a superatmospheric pressure of from about 10 to about 100 atmospheres and at a temperature of from about 80° to about 180° C. with a catalyst composition consisting of aluminum metal, aluminum chloride and a phosphopolymolybdic acid.

References Cited in the file of this patent

UNITED STATES PATENTS 2,845,414  Schutze ---------------- July 29, 1958

FOREIGN PATENTS 1,135,475  France ---------------- Dec. 17, 1956